(12) United States Patent
Haussmann et al.

(10) Patent No.: US 12,126,040 B2
(45) Date of Patent: Oct. 22, 2024

(54) BATTERY HOUSING AND METHOD FOR MOUNTING A BATTERY HOUSING

(71) Applicant: WEBASTO SE, Stockdorf (DE)

(72) Inventors: Jochen Haussmann, Stockdorf (DE); Jerome Tanneur, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 844 days.

(21) Appl. No.: 17/265,797

(22) PCT Filed: Aug. 6, 2019

(86) PCT No.: PCT/EP2019/071140
§ 371 (c)(1),
(2) Date: Feb. 3, 2021

(87) PCT Pub. No.: WO2020/030653
PCT Pub. Date: Feb. 13, 2020

(65) Prior Publication Data
US 2021/0167457 A1     Jun. 3, 2021

(30) Foreign Application Priority Data

Aug. 6, 2018   (DE) .................... 10 2018 119 052.2

(51) Int. Cl.
*H01M 50/249* (2021.01)
*B60K 6/28* (2007.10)
(Continued)

(52) U.S. Cl.
CPC ......... *H01M 50/249* (2021.01); *H01M 50/24* (2021.01); *H01M 50/262* (2021.01); *B60K 6/28* (2013.01); *B60L 50/64* (2019.02); *B60Y 2200/91* (2013.01); *B60Y 2200/92* (2013.01); *B60Y 2400/112* (2013.01); *H01M 2220/20* (2013.01)

(58) Field of Classification Search
CPC . B60K 6/28; B60L 50/64; B60Y 2200/91–92; B60Y 2400/112
See application file for complete search history.

(56) References Cited

U.S. PATENT DOCUMENTS

| 2010/0136402 A1 | 6/2010 | Hermann et al. |
| 2011/0140375 A1 | 6/2011 | Sasaki et al. |
| 2011/0272895 A1 | 11/2011 | Kritzer et al. |

FOREIGN PATENT DOCUMENTS

| CN | 203529051 U | 4/2014 |
| CN | 204726853 U | 10/2015 |

(Continued)

OTHER PUBLICATIONS

International Search Report and Written Opinion for International Patent Application No. PCT/EP2019/071140 mailed Feb. 13, 2020, 11 pages.

(Continued)

*Primary Examiner* — Jonathan G Leong
*Assistant Examiner* — Aryana Y. Ortiz
(74) *Attorney, Agent, or Firm* — Haynes and Boone, LLP

(57) ABSTRACT

A battery housing for constructing a drive battery system for a motor vehicle includes a first housing portion and a second housing portion, which are secured to each other in a connection region with a seal which is located therebetween, wherein there is provided an auxiliary assembly member which is located in the inner space formed by the first housing portion and the second housing portion and at least partially on the connection region.

10 Claims, 1 Drawing Sheet

(51) Int. Cl.
*B60L 50/64* (2019.01)
*H01M 50/24* (2021.01)
*H01M 50/262* (2021.01)

(56) References Cited

FOREIGN PATENT DOCUMENTS

| | | |
|---|---|---|
| CN | 206297903 U | 7/2017 |
| CN | 206976437 U | 2/2018 |
| CN | 207306300 U | 5/2018 |
| CN | 207441818 U | 6/2018 |
| DE | 569864 C | 2/1933 |
| DE | 8535915 U1 | 2/1986 |
| DE | 4020803 A1 | 1/1992 |
| DE | 10306211 A1 | 8/2004 |
| DE | 10 2010 022 876 A1 | 1/2011 |
| EP | 2385274 A1 | 11/2011 |
| EP | 2 525 426 A1 | 11/2012 |
| EP | 2565958 A1 | 3/2013 |
| WO | WO 2015/003786 A1 | 1/2015 |

OTHER PUBLICATIONS

Chinese Office Action dated Jul. 20, 2022 for Chinese Application No. 201980052206.X; 9 pages.

BATTERY HOUSING AND METHOD FOR MOUNTING A BATTERY HOUSING

CROSS REFERENCE TO RELATED APPLICATIONS

This application is a national stage of International Application No. PCT/EP2019/071140 filed Aug. 6, 2019, which claims priority from German Patent Application 10 2018 119 052.2 filed Aug. 6, 2018 in the German Patent and Trademark Office, the disclosures of which are incorporated herein by reference in their entirety.

BACKGROUND

Technical Area

The present invention relates to a battery housing for constructing a drive battery system for a motor vehicle and a method for mounting a battery housing.

Related Art

Battery systems for electric and hybrid vehicles and for vehicles having fuel cells are the subject of current research and development. The performance-related parameters of a battery system, such as the service-life and capacity, are heavily dependent on the application environment. Both in the provision and discharge of electrical power and during charging, the electromechanical processes taking place within the battery are dependent, for example, on the ambient temperature and the air humidity.

An important aspect for reliable operation of a battery system is consequently the provision and maintenance of a well-defined environment for the battery cells. In addition, the battery cells and battery modules which make up the battery system must be protected with respect to environmental conditions. For those reasons and other reasons, during the construction of a battery system there is provided a battery housing which is configured to receive battery modules and to protect them from external influences.

The battery housing is generally provided in several pieces, it includes, for example, a tray-like housing lower portion and a cover which closes this housing lower portion in order to enable the assembly and maintenance of the battery system. In order to ensure a defined atmosphere inside the battery housing, the housing portions may be sealed with respect to each other by means of a flexible seal.

In the event of an accident and in particular in the case of a thermal runaway, in order to be able to rapidly contain any fire which may occur, the atmosphere inside the battery housing is as lean in oxygen as possible or the volume of air remaining in the battery housing is preferably kept low.

DE 10 2010 022 876 A1 thus describes a battery securing arrangement for a vehicle having a battery case which has a battery tray and a cover. A sealing device is provided in a connection region between the battery tray and the cover. A similar battery case with a seal is further disclosed in EP 2 525 426 A1.

Before the housing portions are joined together, the seal has to be correctly positioned and fixed. In this instance, it should be ensured that the seal is located at the correct location and in the correct position and during the assembly also remains in this orientation since otherwise the desired degree of sealing cannot be ensured. The handling of the seal is, however, made more difficult as a result of the flexibility and resilience of the sealing material. The positioning takes time and a residual risk of incorrect positioning and/or damage to the seal therefore cannot be excluded completely in conventional systems.

SUMMARY

The present disclosure provides a battery housing and methods to improve the mounting of a multi-piece battery housing having a seal according to various embodiments.

The method according to one or more embodiments of the invention relates to mounting a battery housing for constructing a drive battery system for a vehicle. The battery housing is generally a battery housing, for instance, for receiving and protecting one or more battery modules for the operation of an electric or hybrid vehicle or a vehicle having a fuel cell.

The battery housing may be produced from plastics material, metal, another material or a combination of different materials.

The battery housing may be constructed in several pieces and has a first and a second housing portion which are intended to be secured to each other in a connection region with a seal which is provided therebetween, wherein the first and second housing portions are typically directly in contact with each other after the securing action.

The first housing portion has in the connection region a seal receiving portion which determines the location and position of the seal in the connection region.

In several embodiments, the two housing portions are screwed to each other. Alternatively, the two housing portions may be clamped, adhesively bonded or connected to each other in another manner.

The terms "first" and "second" are used herein only for nominal differentiation of the two housing portions. A specific order, position, etcetera, is not defined thereby.

In accordance with the method according to one or more embodiments of the invention, the seal is thus fitted to an auxiliary assembly member so that the seal is retained by the auxiliary assembly member at least temporarily in a configuration which corresponds to the final assembly configuration of the seal on the seal receiving portion or corresponds at least to an approximation thereof.

The term "final assembly configuration" is intended to be understood to refer to any form or configuration which the seal has or is intended to have after the two housing portions have been joined together. That is to say, the seal using the auxiliary assembly member is brought into a shape which corresponds to the final assembly configuration or an intermediate configuration, which is an approximation of the final assembly configuration.

If the seal is an annular seal which seals the battery housing peripherally at the connection region, the seal is generally tensioned by means of the auxiliary assembly member in such a manner that it corresponds to the peripheral contour or the peripheral edge of the battery housing at the connection region or is an approximation thereof.

After the seal has been fitted to the auxiliary assembly member, the auxiliary assembly member is arranged together with the seal on the first housing portion so that the seal is located in the seal receiving portion. The seal may in this instance initially partially come into contact with the seal receiving portion of the corresponding housing portion or may also be arranged virtually in a floating manner in the seal receiving portion using the auxiliary assembly member.

The auxiliary assembly member is typically configured in such a manner that the seal with a correctly positioned auxiliary assembly member comes substantially completely into contact with the seal receiving portion in order to avoid the need for subsequent adjustment of the seal.

After the seal has assumed the desired position and location in the seal receiving portion, the first and the second housing portions are connected to each other so that the seal in the connection region in the final assembly configuration thereof is both in contact with the seal receiving portion and is located between the two housing portions. In this manner, when the first housing portion is connected to the second housing portion using the seal, a sealing is produced between the two housing portions.

As a result of the auxiliary assembly member and the use thereof, the positioning and fixing of the seal is facilitated since the spatial configuration of the seal is at least temporarily determined by the auxiliary assembly member or a portion thereof. In addition, the assembly of the seal is carried out in an extremely reliable manner since an incorrect positioning of the seal, a sliding during assembly and the like can be prevented.

The seal also does not have to be positioned and orientated as an individual component. Instead, the seal as a result of the insertion of the auxiliary assembly member already comes to rest at the intended position, that is to say, the final assembly configuration or an intermediate configuration, which is an approximation of the final assembly configuration. The risk of damage to the seal during assembly—for example, as a result of crushing—is thereby also minimized.

Furthermore, the assembly can be accelerated using the auxiliary assembly member. The time saving compared with an individual assembly of the seal reduces the production costs whilst at the same time increasing the production reliability and quality.

In some embodiments, the auxiliary assembly member is introduced together with the seal which is fitted thereto at least partially into the first housing portion, whereby the fitting of the seal to the seal receiving portion is simplified. This applies in particular to an annular, peripheral seal.

The term "annular" is in this instance intended to be interpreted in a broad sense and is not limited only to circular contours. Instead "annular seals" are in this instance those seals which extend completely or substantially completely around the contour or the edge of the battery housing on the connection region.

In certain embodiments, the auxiliary assembly member remains in the battery housing during and after the connection of the first housing portion to the second housing portion so that in the assembled state it is an integral component of the housing interior.

Alternatively, it is possible to release the auxiliary assembly member from the seal and to remove it from the first housing portion before the first and the second housing portions are connected, whereby the auxiliary assembly member would be able to be reused. However, the auxiliary assembly member remaining inside the battery housing is, on the one hand, advantageous in order to stabilize the seal from the inner side during the entire assembly by a portion of the auxiliary assembly member remaining on the connection region and thus providing a permanent stabilization for the seal. On the other hand, the flammability of the battery housing or the components which are received therein can be reduced if the auxiliary assembly member is produced from a material which is not readily flammable or which is self-extinguishing. As a result of its volume, the auxiliary assembly member further reduces the free air volume and consequently also the oxygen volume inside the battery housing.

The auxiliary assembly member is consequently generally used both to fill unused empty spaces in the battery housing and to insert and stabilize the seal, whereby safety aspects and sealing are achieved in a synergetic manner. To this end, the auxiliary assembly member is typically produced completely or partially from a foam material. This is light and displaces air and consequently oxygen, whereby the battery housing is more difficult to ignite.

In various embodiments, at least a portion of the auxiliary assembly member remains in contact with the seal after the first and second housing portions have been connected, whereby a permanent stabilization of the seal by the auxiliary assembly member is produced. When the seal receiving portion is a sealing face which is shaped in such a manner that the seal is exposed completely or partially in the direction of the housing interior, a portion of the auxiliary assembly member, for example, the outer periphery of the mounting frame described below, forms a portion of the seal receiving portion.

In some embodiments, the auxiliary assembly member has a mounting frame, for example, a mounting plate, wherein the fitting of the seal to the auxiliary assembly member involves pulling the seal onto the mounting frame. The mounting frame thus predetermines the desired configuration of the seal. The seal is generally resiliently deformed when pulled on.

In several embodiments, the mounting frame has a cross-section which at least partially or substantially corresponds to the inner contour of the first housing portion. In this instance, the mounting frame is introduced partially or completely into the corresponding housing portion in order to position the seal. In this manner, no incorrect positioning of the seal, a sliding during assembly and the like can be prevented in an even more reliable manner.

In certain embodiments, the mounting frame is formed in such a manner that it can be inserted into the first housing portion in a substantially positive-locking manner. In this manner, an incorrect positioning of the seal, a sliding during assembly and the like can be prevented in an even more reliable manner.

In various embodiments, the mounting frame has one or more projections which are configured to retain the seal. In this instance, the projections are directed outward and formed at the outwardly directed ends thereof in such a manner, for example a concave manner, that the seal can be pulled onto it and is retained in the position and location predetermined by the projections.

The auxiliary assembly member may be configured to be adjustable in order to be able to adapt it in a flexible manner to different housing geometries or different contours of the seal receiving portion. Such an adjustability may also simplify the pulling on and/or release of the seal. To this end, for example, the projections or a portion thereof may be configured to be movable, pivotable or adjustable in another manner.

In several embodiments, the first housing portion is a housing lower portion, for instance, a tray-like housing portion and the second housing portion is a cover. In this instance, the seal is generally positioned on the housing lower portion before the cover is fitted to the housing lower portion and is connected thereto.

In various embodiments, the seal is an annular seal which in the unloaded state has, for example, a circular cross-section perpendicular to the extent direction.

In certain embodiments, the seal is produced from a resilient material, for example, rubber, silicone, polyethylene or polytetrafluoroethylene.

A battery housing for constructing a drive battery system for a motor vehicle is also described herein, wherein the battery housing has a first and a second housing portion which are secured to each other in a connection region with a seal which is located therebetween, wherein there is provided an auxiliary assembly member which is located in the inner space formed by the first and second housing portions and at least partially on the connection region.

The features, technical effects, advantages and embodiments which have been described with reference to the method apply in a similar manner to the battery housing.

Other advantages and features of the present invention can be seen in the following description of various embodiments. The features described therein can be implemented alone or in combination with one or more of the above-described features, as long as the features are not contradictory. The following description of certain embodiments is given with reference to the appended drawings.

BRIEF DESCRIPTION OF THE FIGURES

Further embodiments of the invention are explained in greater detail by the following description of the Figures.

FIG. 1 is a perspective view of a corner cut-out of a housing lower portion and an auxiliary assembly member with the seal pulled on;

DETAILED DESCRIPTION

Figure 1:
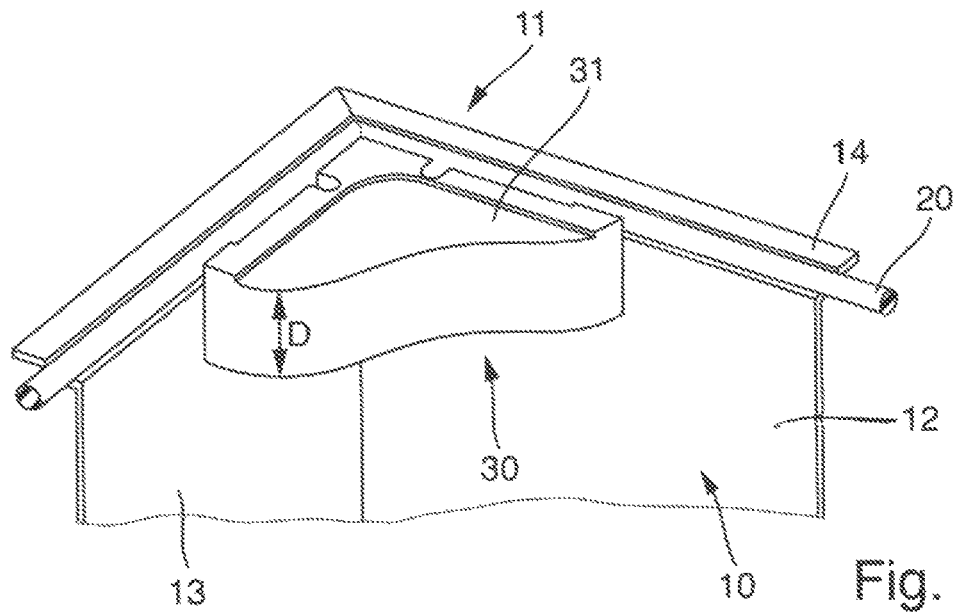

Exemplary embodiments are described below with reference to the Figures. In this instance, elements which are identical, similar or functionally identical are given identical reference numerals in the different Figures and a repetition of the description of these elements is partially omitted in order to avoid redundancies.

Figure 2:
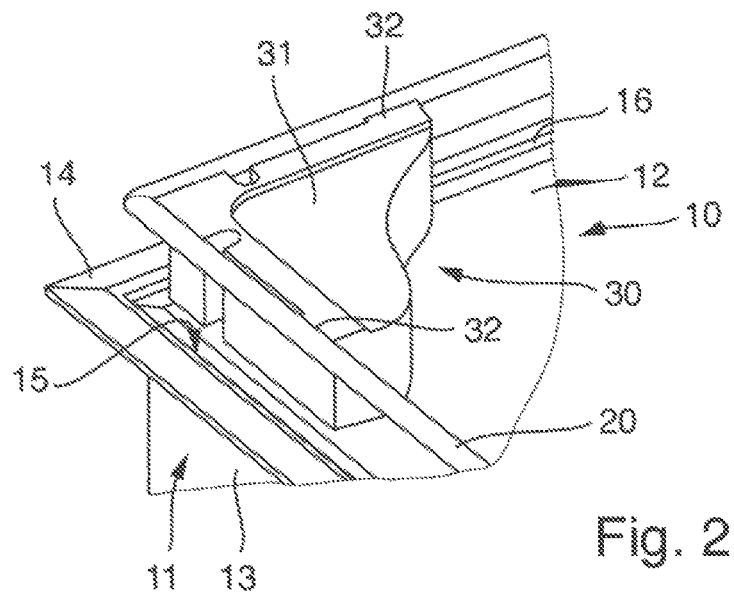
FIG. 2 shows the arrangement of FIG. 1 from a different perspective and in an earlier method stage.
Figure 3:
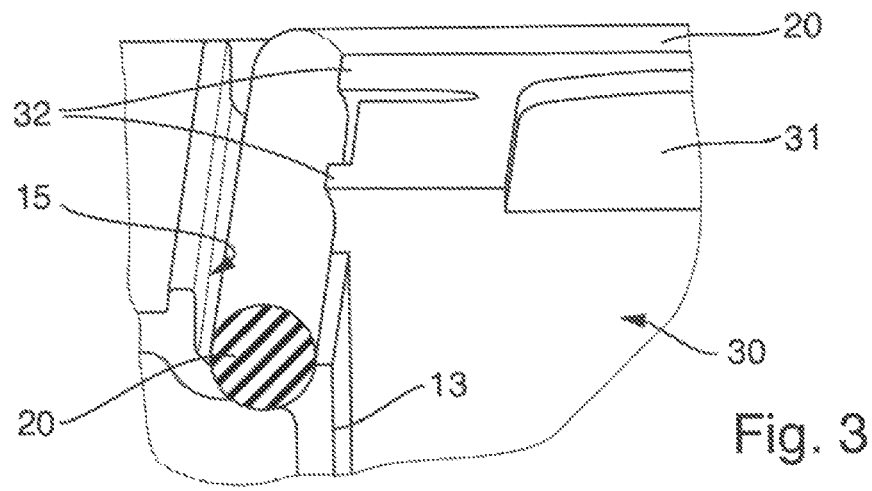
FIG. 3 is an enlarged cut-out of the arrangement according to FIG. 1.

FIGS. 1 to 3 show a corner cut-out of a battery housing 10 for receiving and for protecting one or more battery modules for constructing a drive battery system for the operation of an electric or hybrid vehicle.

The Figures show by way of example a tray-like housing lower portion 11 which for the assembly of the battery housing 10 is intended to be connected to a cover which is not illustrated in this instance, wherein the cover is placed on the tray-like housing lower portion 11 and consequently closes the upwardly facing assembly opening of the tray-like housing lower portion 11.

The tray-like housing lower portion 11 has side walls 12 and 13, additional side walls which are not shown and a base which is also not shown. It should be noted that the housing form illustrated is only very exemplary. The battery housing 10 may instead have any shape as long as it is suitable for receiving and protecting electrical and electronic components and in particular battery modules. In addition, the housing lower portion 11 (in a similar manner to the cover) may be constructed integrally or in several pieces. In particular, the housing lower portion 11 is not limited to the above-mentioned structure with a plurality of side walls 12, 13 and a base, but may instead assume any other advantageous form.

At the connection region between the housing lower portion 11 and the cover which is not shown, the housing lower portion 11 has a flange 14 which for assembly comes into contact with a correspondingly shaped counter-portion of the cover in an abutting manner. The flange 14 extends from the side walls 12, 13 outwardly and extends around the housing lower portion 11 in the manner of a rail. The flange 14 may be secured to the housing lower portion 11 or constructed integrally therewith.

During the assembly, the housing lower portion 11 and the cover may form a positive-locking and/or non-positive-locking connection. In some embodiments, the two housing portions are screwed to each other. Alternatively, the two housing portions can be clamped, adhesively bonded or securely connected to each other in another manner.

In order to seal the housing lower portion 11 and the cover in a gas-tight and/or liquid-tight manner, the flange 14 has a seal receiving portion 15 in which a seal 20 is intended to be placed. The seal receiving portion 15 is in the simplest case a planar face of the flange 14. In certain embodiments, the seal receiving portion 15 is a groove and/or includes a specially formed sealing face 16 which is adapted to a contour of the seal 20.

The seal 20 is in the present embodiment an annular element having a circular cross-section perpendicular to the extent direction (in the unloaded state). The seal 20 is produced from a resilient material, for example, rubber, silicone, polyethylene or polytetrafluoroethylene.

After the housing lower portion 11 has been connected to the cover, the seal is located in such a sealing manner between the two housing portions that it seals the connection region with respect to the discharge and/or introduction of liquids and/or gases at least within a specific pressure range.

In order to assemble the seal 20, that is to say, in order to fit or introduce the seal 20 onto or into the seal receiving portion 15, the seal 20 is first pulled onto an auxiliary assembly member 30. This means in specific terms that the seal 20 is moved using the auxiliary assembly member 30 into the final assembly configuration, that is to say, the form or configuration which the seal 20 has after the assembly of the housing lower portion 11 and the cover, or in an intermediate configuration which is an approximation of the final assembly configuration.

The pulling of the seal 20 onto the auxiliary assembly member 30 may involve a tensioning and an expansion thereof. In various embodiments, the seal 20 is brought by the auxiliary assembly member 30 into a form which corresponds to the extent of the seal receiving portion 15 in the periphery thereof in the plane defined by the connection region.

In the present embodiment, the auxiliary assembly member 30 has a mounting plate 31 having a predetermined thickness D. In FIGS. 1 to 3, only a corner cut-out of the mounting plate 31 is shown. In fact, however, the mounting plate 31 has a cross-section perpendicular to the thickness direction which substantially follows the inner contour of the housing lower portion 11. The mounting plate 31 is generally formed in such a manner that it can be inserted into the housing lower portion 11 in a positive-locking manner.

In other words, the mounting plate 31 fills the volume which is provided between the elements received in the housing lower portion 11, for example, the battery modules, and the cover which is intended to be fitted to the connection region. The mounting plate 31 can consequently also perform the function of a volume displacer. In this manner, the volume of air present in the housing which is then closed can be reduced or displaced in order to improve the fire properties of the battery housing.

Consequently, the auxiliary assembly member 30, even after the battery housing has been closed by the cover being fitted, remains inside the battery housing 10 which is then closed.

The mounting plate 31 has one or more flange-like projections 32, which are configured to retain the seal 20. To this end, the projections 32 are formed in such a manner at the outwardly directed ends thereof, typically formed in a concave manner, that the seal 20 can be pulled onto them and is retained in the position and location predetermined by the projections 32.

In place of a plate-like structure, the auxiliary assembly member 30 may alternatively also have a mounting frame which may be formed and structured in a variety of ways as long as it enables a temporary or permanent fitting of the seal 20. The term "mounting frame" includes the mounting plate 31 described above.

After the seal 20 has been pulled onto the auxiliary assembly member 30, the arrangement including the auxiliary assembly member 30 and seal 20 is inserted into the housing lower portion 11 in such a manner that the seal 20 comes into contact with the seal receiving portion 15. The insertion operation best results from the transition from the state of FIG. 2 into the state of FIG. 1.

The auxiliary assembly member 30 remains in the battery housing 10 when the housing lower portion 11 and the cover are connected so that in particular the mounting plate 31 after assembly is an integral component of the housing interior. In principle, it may be possible for the auxiliary assembly member 30 to be released from the seal 20 and removed from the housing lower portion 11 before the housing lower portion 11 and the cover are connected, whereby the auxiliary assembly member would be able to be reused.

However, the auxiliary assembly member 30 remaining inside the battery housing 10 is, on the one hand, advantageous in order to stabilize the seal 20 during the assembly and also afterward from the inner side by a portion of the auxiliary assembly member 30 remaining on the connection region and thus providing a permanent stabilization for the seal 20. On the other hand, the flammability of the battery housing 10 or the components which are received therein can be reduced if the auxiliary assembly member 30 is produced from a material which is not readily flammable or which is self-extinguishing. The auxiliary assembly member 30 additionally reduces the air volume present inside the battery housing 10 and consequently also the oxygen volume present.

The auxiliary assembly member 30 is consequently generally used both for filling unused empty spaces in the battery housing 10 and for inserting and stabilizing the seal 20, whereby safety aspects and sealing are achieved in a synergetic manner. To this end, the auxiliary assembly member 30, in particular the mounting plate 21, is typically produced completely or partially from a foam material. This material is light and displaces oxygen, whereby the battery housing 10 is difficult to ignite.

If the battery housing 10 contains a so-called "organizer", in the foam structure of which other components of the battery system—for example, cables, connections or electronic components—can be received, this can be used synergetically in the manner described above as an auxiliary assembly member 30.

If the seal receiving portion 15 is a sealing face 16 which is formed in such a manner that the seal 20 is partially or completely exposed in the direction of the housing interior, as seen in FIG. 1, the outer periphery of the mounting plate 31 to some degree forms a portion of the seal receiving portion 15, whereby the stabilization of the seal 20 by the auxiliary assembly member 30 is achieved.

As a result of the auxiliary assembly member 30 and the use thereof, the positioning and fixing of the seal 20 is facilitated since the spatial configuration of the seal 20 is predetermined by the auxiliary assembly member 30 or a portion thereof. In addition, the assembly of the seal 20 is carried out in an extremely reliable manner since an incorrect positioning of the seal 20, a sliding during assembly and the like are prevented. The seal 20 does not have to be positioned and orientated as an individual component. Instead, the seal 20 after the insertion of the auxiliary assembly member 30 is already at the intended position and in the final assembly configuration or an intermediate configuration which is an approximation of the final assembly configuration. The risk of damage to the seal 20 during assembly is thereby also minimized. Furthermore, the assembly using the auxiliary assembly member 30 can be accelerated. The time saving compared with an individual assembly of the seal reduces the production costs whilst at the same time increasing the production reliability and quality.

Where applicable, all individual features which are set out in the embodiments can be combined with each other and/or interchanged without departing from the scope of the invention.

The invention claimed is:

1. A method for mounting a battery housing for constructing a drive battery system for a vehicle, the battery housing comprising a first housing portion and a second housing portion that are to be secured to each other in a connection region with a seal provided therebetween, the first housing portion having a seal receiving portion in the connection region, and the seal receiving portion predetermining a location and a position of the seal in the connection region, the method comprising:
   fitting the seal to an auxiliary assembly member so that the seal is retained by the auxiliary assembly member at least temporarily in a configuration which corresponds to a final assembly configuration of the seal on the seal receiving portion or to an intermediate configuration, wherein the auxiliary assembly member comprises a mounting frame or a mounting plate, and the fitting of the seal to the auxiliary assembly member comprises pulling the seal onto the mounting frame or the mounting plate;
   arranging the auxiliary assembly member together with the seal that is fitted thereto on the first housing portion so that the seal is located in the seal receiving portion; and
   connecting the first housing portion and the second housing portion while the seal is located between the first and second housing portions in a state retained in the final assembly configuration thereof by the auxiliary assembly member.

2. The method of claim 1, further comprising introducing the auxiliary assembly member together with the seal that is fitted thereto at least partially into the first housing portion.

3. The method of claim 2, wherein the auxiliary assembly member remains in the battery housing when the first housing portion and the second housing portion are connected.

4. The method of claim 3, wherein at least a portion of the auxiliary assembly member remains in contact with the seal after the first housing portion and second housing portion have been connected.

5. The method of claim 1, wherein the seal is resiliently deformed while being pulled onto the mounting frame or the mounting plate.

6. The method of claim 1, wherein the mounting frame or the mounting plate has a cross-section that at least partially corresponds to an inner contour of the first housing portion.

7. The method of claim 6, wherein the mounting frame or the mounting plate is configured to be inserted into the first housing portion in a substantially positive-locking manner.

8. The method of claim 1, wherein the mounting frame or the mounting plate comprises one or more projections that are configured to retain the seal.

9. The method of claim 1, wherein the seal comprises an annular seal.

10. The method of claim 9, wherein the annular seal, in an unloaded state, comprises a circular cross-section perpendicular to an extent direction.

\* \* \* \* \*